(12) United States Patent
Endres et al.

(10) Patent No.: US 10,549,361 B2
(45) Date of Patent: Feb. 4, 2020

(54) ROTARY CUTTING INSERT AND SUPPORT DEVICE

(71) Applicants: William J. Endres, Houghton, MI (US); Douglas J. Woodruff, Atlantic Mine, MI (US)

(72) Inventors: William J. Endres, Houghton, MI (US); Douglas J. Woodruff, Atlantic Mine, MI (US)

(73) Assignee: EIP Holdings, LLC, Hougton, MI (US)

( * ) Notice: Subject to any disclaimer, the term of this patent is extended or adjusted under 35 U.S.C. 154(b) by 148 days.

(21) Appl. No.: 15/610,775

(22) Filed: Jun. 1, 2017

(65) Prior Publication Data

US 2017/0348779 A1 Dec. 7, 2017

Related U.S. Application Data

(60) Provisional application No. 62/344,355, filed on Jun. 1, 2016.

(51) Int. Cl.
| | |
|---|---|
| *B23B 27/12* | (2006.01) |
| *B26D 1/12* | (2006.01) |
| *F16C 19/54* | (2006.01) |
| *B23C 5/22* | (2006.01) |
| *B23C 5/06* | (2006.01) |
| *B23C 5/20* | (2006.01) |
| *F16J 15/32* | (2016.01) |

(52) U.S. Cl.
CPC .............. *B23C 5/2247* (2013.01); *B23C 5/06* (2013.01); *B23C 5/207* (2013.01); *F16C 19/545* (2013.01); *F16C 19/548* (2013.01); *F16J 15/32* (2013.01); *B23C 2200/045* (2013.01); *B23C 2210/165* (2013.01); *B23C 2210/506* (2013.01); *B23C 2260/08* (2013.01); *F16C 2322/00* (2013.01)

(58) Field of Classification Search
CPC ......... B23C 5/06; B23C 5/207; B23C 5/2221; B23C 5/2226; B23C 5/223; B23C 5/2247; B23C 2200/045; B23C 2210/165; B23C 2210/506; B23C 2260/08; F16J 15/32; F16C 19/361; F16C 19/364; F16C 19/38; F16C 19/386; F16C 19/545; F16C 19/548; F16C 2322/00
See application file for complete search history.

(56) References Cited

U.S. PATENT DOCUMENTS

| | | | | |
|---|---|---|---|---|
| 2,230,455 | A * | 2/1941 | Githens | B23B 27/12 407/1 |
| 2,233,724 | A * | 3/1941 | Bannister | B23B 27/12 407/103 |
| 2,551,167 | A * | 5/1951 | Rolland | B23B 27/10 407/7 |
| 3,515,029 | A * | 6/1970 | Gambini | B23B 5/16 407/37 |

(Continued)

*Primary Examiner* — Sara Addisu (57) ABSTRACT

This invention relates to cutting tools used to machine materials to produce new surfaces and chips of removed material. Embodiments of this invention allow round rotating cutting inserts to be used in a more economical way, with improved accuracy, with improved sealing, and with greater ease of use. The rotary support device and cutting inserts may be used in either radial or tangential mounting types of cutters. It also provides a built-in, fully sealed means of fine adjustment of the cutting insert that is useful in some applications.

18 Claims, 10 Drawing Sheets

(56) References Cited

U.S. PATENT DOCUMENTS

| | | | | |
|---|---|---|---|---|
| 4,178,818 A | * | 12/1979 | Yascheritsyn | B23B 27/12 407/11 |
| 4,191,075 A | * | 3/1980 | Morgunsky | B23B 27/12 407/11 |
| 4,213,358 A | * | 7/1980 | Yascheritsyn | B23B 27/12 407/2 |
| 4,477,211 A | * | 10/1984 | Briese | B23B 27/12 407/7 |
| 4,824,300 A | * | 4/1989 | Pomikacsek | B23C 3/12 407/7 |
| 5,505,568 A | * | 4/1996 | Takama | B23B 27/12 407/64 |
| 5,658,100 A | * | 8/1997 | Deiss | B23C 5/109 407/104 |
| 5,975,811 A | * | 11/1999 | Briese | B23C 5/22 407/40 |
| 6,601,620 B1 | * | 8/2003 | Monyak | A01G 23/067 144/24.12 |
| 8,690,490 B2 | * | 4/2014 | Pokolm | B23C 5/2221 407/48 |
| 2008/0232909 A1 | * | 9/2008 | Filho | B23B 1/00 407/7 |
| 2012/0051862 A1 | * | 3/2012 | Woodruff | B23B 29/03 408/83 |
| 2014/0186127 A1 | * | 7/2014 | Parker | B23B 29/12 407/7 |
| 2018/0318941 A1 | * | 11/2018 | Chang | B23C 5/202 |

\* cited by examiner

ROTARY CUTTING INSERT AND SUPPORT DEVICE

CROSS-REFERENCE TO RELATED APPLICATION

This application is based upon and claims priority to U.S. Provisional Application Ser. No. 62/344,355 filed Jun. 1, 2016, the disclosures of which are hereby incorporated in their entirety by reference herein.

BACKGROUND OF THE INVENTION

Figure 1A:
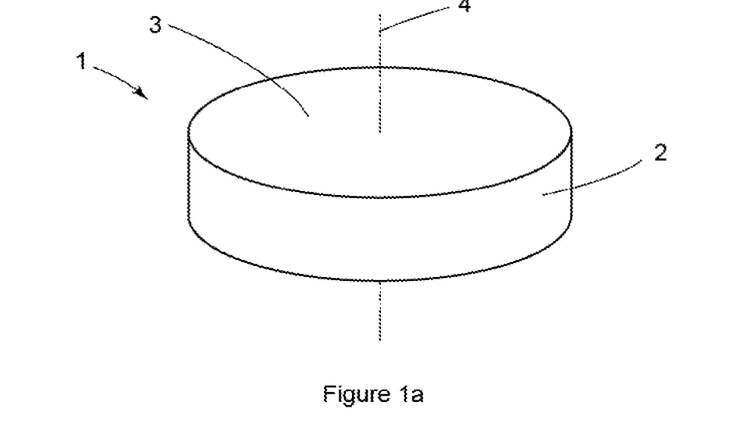
FIG. 1a is a basic round cutting insert in its most fundamental form.
Figure 1B:
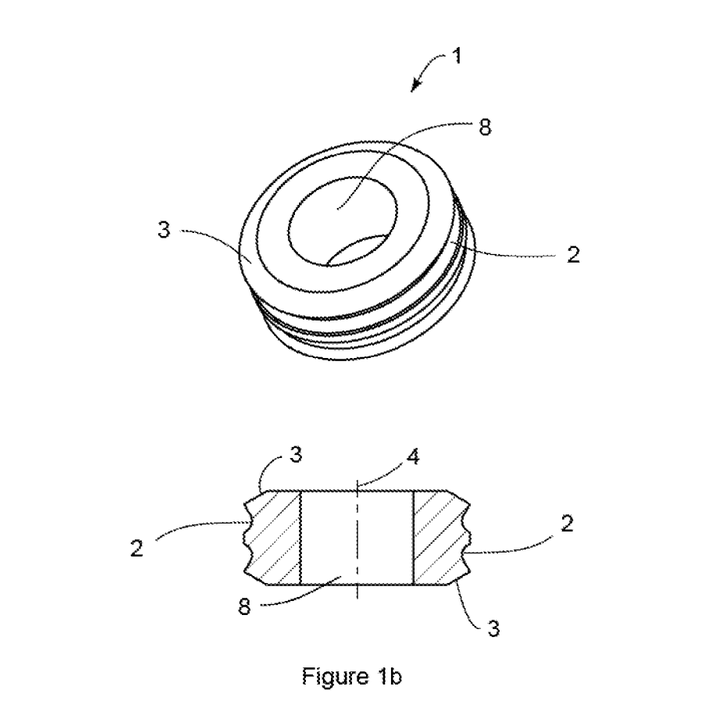
FIG. 1b is a round cutting insert showing a non-cylindrical peripheral surface and non-planar end surfaces.
Figure 2:
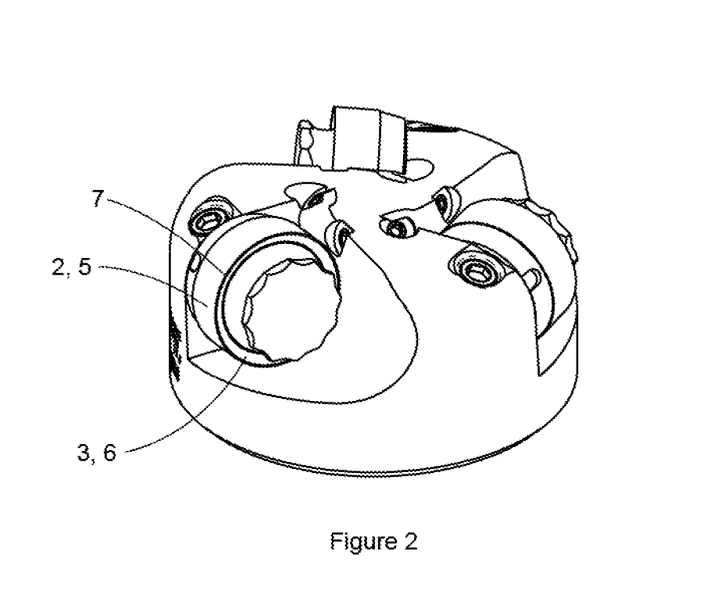
FIG. 2 is a face mill as an example illustration, with the flank surface and rake surface called out, in a conventional radial mounting of a round cutting insert.
Figure 3:
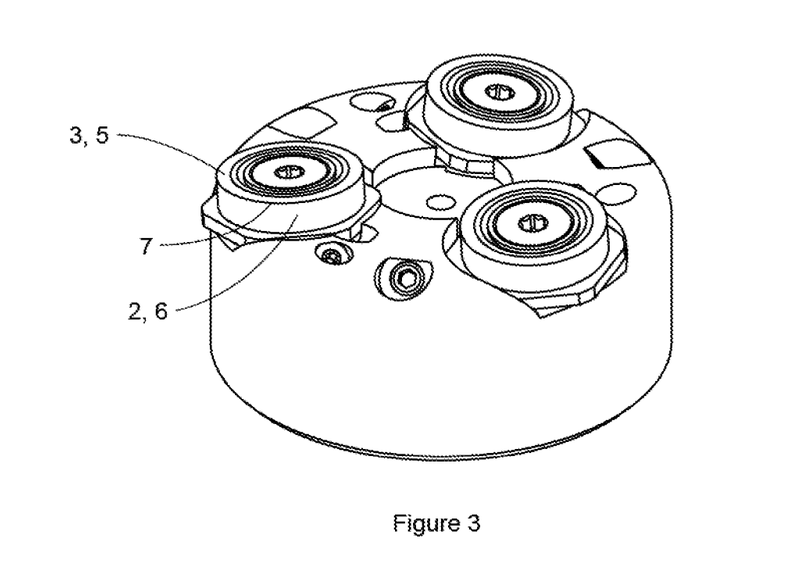
FIG. 3 is a face mill as an example illustration, with the flank surface and rake surface called out, in a tangential mounting of a round cutting insert.

The invention addresses cutting tools used to remove material such as from a workpiece or bulk feedstock. More specifically, it addresses such tools that employ a round cutting insert that rotates under the force of the material removal process as a result of the cutting insert being affixed to a support device that permits rotation about the axis of the cutting insert. The most basic representation of a round cutting insert 1 is depicted in FIG. 1a; it is fundamentally a disk having an axisymmetric peripheral surface 2, two axisymmetric end surfaces 3, and insert axis 4 about which said surfaces are axisymmetric. One or both the end surfaces 3 can be partially or entirely non-planar and the peripheral surface 2 may also be non-cylindrical, one example of which is shown in FIG. 1b. There are two basic configurations for machining with a round cutting insert. A conventional radial mount is shown in FIG. 2 (a face milling tool as an example) where flank surface 5 is the peripheral surface 2 and rake surface 6, the surface on which the chip of removed material is formed, is one of the end surfaces 3. This type of configuration is the subject of numerous patents, such as U.S. Pat. Nos. 2,885,766A, 3,329,065, 4,477,211, 5,478,175. The other configuration is a tangential mount as shown in FIG. 3 (a face milling tool as an example) where rake surface 6 is the peripheral surface 2 and flank surface 5 is one of the end surfaces 3. This type of configuration is the subject of numerous patents, such as U.S. Pat. Nos. 2,127,523, 2,233,724, 2,551,167 and 4,223,580 for single-point lathe processes used to create surfaces of revolution and more recently U.S. application Ser. No. 14/502,035 for a variety of multi-tooth processes where compactness of the rotary support device upon which the round cutting insert is affixed is important, as compared to many lathe applications. In all cases, the circular intersection of flank surface 5 and rake surface 6 defines a round cutting edge 7. Generally, for a rotating round cutting insert, there must be a central hole 8 to facilitate mounting cutting insert 1 to rotary support device 21.

When machining, heat energy is generated by friction and deformation of the workpiece material (i.e., the cutting process) that is then imparted from the cutting process into the cutting insert. As the rate of heat generation in the process increases, such as by running the cutting tool at a higher cutting speed, the temperature of the tool (i.e., the cutting insert) increases. Increased temperature is a primary cause of increased tool wear rate. Allowing the cutting insert to rotate helps to moderate the effect of heat energy generated by the cutting process, extending tool life and/or allowing the cutting tool to operate at higher speed without excessively compromising tool life. Rotation of the cutting insert without human intervention also allows the entire circumference of the round cutting insert, the round cutting edge, to be fully consumed with no need for human intervention to rotate to fresh regions of the circumference (referred to as indexing), which is required for non-rotating cutting inserts.

The need for a rotary support device that constrains five degrees of freedom while allowing one degree of freedom to be free, that is, the noted rotation about the axis of the round cutting insert, adds manufacturing cost to the cutting tool. Keeping manufactured cost low enough so that the increased performance of a rotating-insert cutting tool is sufficient to justify its added purchasing expense has been a consistent challenge in previous attempts at commercializing such cutting tools. A main driver of this challenge is the extreme operational demands on the rotary support device, the cutting insert, and the cutting insert's connection to and interface with the rotary support device. The present invention addresses the numerous past shortcomings in meeting the operational demands in a manner that is geometrically compact and cost effective.

One of the main challenges is that the rotary support device, and the cutting insert itself, must mechanically support the high cutting process forces. For the cutting insert, ample cross-section is required so that it does not crack, and a larger cross-section consumes more of the limited space available. For the rotary support device, the challenge lies in transmitting/supporting the noted forces across its internal surfaces that allow relative rotary motion to occur while constraining all other motions, and at the same time maintaining sufficient cross-sections to avoid cracking or other deformation failure, again, all this being achieved in the limited space available.

Relative rotary motion is provided by "bearings". In plain bearings static friction between two mating bearing surfaces is overcome to allow relative motion due to sliding. In rolling-element bearings relative motion occurs due to rolling of round elements (e.g., balls/spheres, cylinders, or frusto-conical (tapered) solids/rollers) between the two bearing surfaces. Commercial-off-the-shelf rolling-element bearings incorporate the bearing surfaces into components referred to as "raceways" or races, for short. For rolling-element bearings there is minimal (in some cases theoretically zero) sliding friction. The rotating-insert cutting tool application requires extremely compact packaging of the bearings relative to commercial standard bearings that would be specified to support forces of the magnitude seen from the cutting process. Thus, to summarize, one of the longstanding challenges that have inhibited the widespread practical commercial adoption of rotating-insert cutting tools is the need to arrange and package the bearings very compactly while being able to support the high forces without catastrophic failure or a limited fatigue life. Commercial-off-the-shelf rolling-element bearings generally do not exist to such optimal levels of load bearing capacity, in the needed degrees of freedom, relative to the size of the bearing; that is, there is not sufficient market to motivate bearing companies to design and produce such size-optimized bearings, at least not for most metal-cutting applications where it is preferred or required that the cutting insert be small (for example and without limitation, less than 25-30 mm in diameter). For example, in U.S. Pat. No. 4,477,211 for a "rotary tool cutting cartridge", the rotary support device (the rotary tool cutting cartridge) employs lower and upper rolling-element thrust bearings and radial needle-roller bearings that make use of a specially designed housing as the bearing raceways and in such a way as to maximize the number of rolling elements. Still, while space is saved by not using a pre-packaged off-the-shelf bearing and rather using a special-purpose housing, that housing exhibits significant bulk in its cross-section.

Another significant shortcoming in past attempts at commercial application of rotating-insert cutting tools is contamination of the bearing surfaces noted above. Particles of removed material, dust, and even metal working fluid, that infiltrate from the working environment into the bearings can have a deleterious or even catastrophic (seizing the relative motion) effect. In general applications where relative rotary motion occurs between plain and/or rolling-element bearings, the bearing surfaces are packaged in such a way as to seal out external contamination. Rotary seals that are very compact are difficult to find with the exception of those that are built into standard bearings that, as noted, generally do not meet the size/packaging needs of this application. Thus, a specially designed rotary support device requires the use of either standard seals or specially designed seals. The former are available, like bearings, in general purpose designs that are not as compact as desired, and the latter are either very expensive or, in at least some known examples, result in excessive friction, wear and reduction in sealing performance over time. For example, U.S. Pat. No. 4,477,211 employs an O-ring to seal the lower end of the rotary support device (referred to as a "cartridge" in the reference) or, as an alternative, a C-ring. The product based on this patent and sold by Rotary Technologies Corp. ultimately employed a C-ring seal that consumes 1.4 mm radially and 2.5 mm axially. A second-generation product offered by Rotary Technologies Corp., based on U.S. application Ser. No. 12/350,181, actually does use an O-ring, as called out in that application. While it seals well, and is more compact (0.9 mm radially and 1.0 mm axially), it is extremely tight causing significant friction. In fact, the O-ring approach to a rotary seal, while elegant and simple, is not a usual use of an O-ring, and is not well suited due to the typical tolerances on the cross-sectional size of the O-ring section. As a result, accommodating the noted tolerance requires the seal to be excessively tight/compressed at one end of the tolerance band. It then wears significantly and eventually may lose its sealing ability due to wear.

Along with the challenge noted to support the cutting process forces by the rotary support device is the consideration of what it means to "support" the forces. Metal-cutting (and when cutting materials other than metal in order to produce a new surface intended ultimately for some function) requires the support of those forces to be stiff enough that the deflection of the cutting insert relative to the workpiece (tool-work deflection) is small enough to provide acceptable results. First, the rigidity must be sufficient to avoid unstable vibrations in the noted tool-work deflection, referred to as chatter. Second, the rigidity must be sufficient to avoid tool-work deflection large enough that the dimension and/or surface finish of the machined surface feature do not meet the specified tolerances, which in many cases are fairly tight. For past implementations of rotating-insert cutting tools, maintaining precision of the produced surface has been a challenge due to the need to maintain a relatively rigid support of the cutting insert in five degrees of freedom (three translational, two rotational) while allowing it to also freely move in the sixth degree of freedom (rotation about the axis of the round cutting insert). The bearing arrangement noted in U.S. Pat. No. 4,477,211, where radial bearings are used along with axial thrust bearings, is common across known attempts at applying rotating-insert cutting tools. While it is routinely possible to apply an axial preload to eliminate axial clearance/slop in the rotary support device, that is not possible in the radial direction when using a radial bearing. This is critical in that the cutting insert is then not completely constrained in all the degrees of freedom other than that of the cutting insert axis of rotation. The result is a compromised finish/roughness on the surface produced; often there are small serrations or waves that fully (six-degree-of-freedom) constrained cutting inserts do not produce. No realistic tolerance on the diametric surfaces between which radial rolling elements are located can eliminate the noted radial clearance/slop.

Also posing a challenge in regard to precision in the machined surface is how well the round cutting insert is centered/concentric about the rotary axis of the rotary support device. This is largely influenced by the means of how the cutting insert is located on the rotating portion of the rotary support device (in the configurations considered here, that is referred to as the "rotor" as it rotates relative to the fixed "stator", and the cutting insert is affixed to and located by the rotor). Many past attempts at commercial rotating-insert cutting tools require an inner diameter of the cutting insert to match the outer diameter of a mating element, such as the rotor, in close slip-fit tolerance while that inner diameter of the cutting insert must also exhibit a close/tight concentricity tolerance relative to the round cutting edge. Of course, this all also presupposes that the inner bearing surface of the rotor is closely concentric to its outer diametric surface to which the insert is located by its inner diametric surface, and that there is minimal radial clearance/gapping between the needle rollers and the rotor inner diametric surface and the supporting diametric surface of the stator. All these noted requirements for close tolerances and concentricities add cost to the rotary support device itself and the cutting insert, and for the usual radial bearing no practical tolerance can eliminate the radial bearing clearance/gapping/slop noted above. As noted, one of the main commercial challenges in rotating-insert cutting tools is their high cost, both in the cutting tool (rotary support device) itself and in the disposable/perishable cutting inserts.

Another less quantifiable challenge to successfully meeting the needs of a commercial market with rotating-insert cutting tools is their ease of use. Compared to traditional fixed (i.e., non-rotating/nonmoving) cutting inserts (relative to the cutting tool body to which they are attached) rotating-insert cutting tools have inherent complexity. Furthermore, due to the inherent potential for rotation of the cutting insert relative to the rotor, provisions must exist that eliminate the potential for the cutting insert to become loose or disconnected from the rotor, such as by loosening of a threaded fastener due to induced rotation of the cutting insert relative to the rotor that, through friction between the cutting insert and a mating threaded fastener that is threaded onto/into the rotor, causes the threaded fastener to loosen relative to the rotor. One solution is to use a left-handed fastener to affix a rotating insert that rotates in a left-handed fashion (and right-handed, vice versa) so the potential insert-rotor relative rotation would serve to tighten the fastener. This requires that a left-hand version and a right-hand version of the rotary support device be made available to customers to serve all types of cutting tool needs. This is the approach taken in the products of Rotary Technologies Corp. based on U.S. Pat. No. 4,477,211.

Another approach is to have one or more threaded fasteners that hold the cutting insert to the rotor in ways that avoid the axis of the threaded fasteners being coaxial with the rotor-insert axis. One manner of taking this approach was indicated in U.S. patent application Ser. No. 12/350,181. In most cases due to size/compactness limitations, this involves small screws and small tools. In the product line that resulted from that patent application, to avoid the small screws and tools, a cutting insert retention device was devised (not in application Ser. No. 12/350,181) that tightens to itself and, in so doing, cinches onto mating geometry on the rotor to clamp the cutting insert against the opposing axially planar mounting surface. As such, any relative rotation between the cutting insert and rotor cannot loosen the insert retention device since its threaded tightening happens between two components within the retention device. In the example noted, the insert retention device may work quite well, but it is not familiar to most users, requires special tools, and is of high cost and complexity.

Finally, coming back to cost as an ultimate practical commercial hurdle, a general challenge to any design of such a system is the recognition that all the noted challenges must be overcome with special designs that are economically produced/manufactured at the production volumes that are generally low relative to commercial, general-purpose bearings and seals, for instance. The present invention takes into consideration these production volume cost drivers as well.

The domain of application includes various types of cutting tools used to produce various types of surfaces in various types of work materials. A round cutting insert mounted to a rotary support device may be attached to a cutter body that is rotated at high speed on a machine spindle to perform operations such as, but without limitation, face milling, end milling, drilling, or cylinder boring. The round cutting insert mounted to a rotary support device may also be attached to a shank that is affixed to a lathe to perform OD turning, ID turning/boring or facing. The cutting insert may be oriented relative to the cutting motion in either a conventional radial mounting or a tangential mounting, as noted earlier. In many cases, the "rotary support device" may be termed a rotary "cartridge" or "cassette"; it is affixed to the cutter body, upon which is affixed a cutting insert, to comprise the cutting tool. For cutting tools like face mills and cylinder boring tools that employ more than one cutting insert, it is often important that at least one cutting insert be precisely positioned in the depth-of cut direction relative to other cutting inserts. For this reason, this invention provides an embodiment that incorporates adjustability to the rotary support device, which from this point forward may be abbreviated RSD.

BRIEF SUMMARY OF THE INVENTION

The present invention relates to machining processes used to create chips of material and new surfaces on a workpiece, in particular through the use of a cutting tool that employs one or more rotating cutting inserts. The present invention includes a rotary support device (RSD) with either one or two tapered bearings for fully supporting the radial load and the axial load, in both directions, with bi-directional (axial and radial) preloading to eliminate radial bearing clearance/gapping/slop, and including the option of adjustability to achieve precise positioning in the depth-of-cut direction, in particular for tangential mount configurations. The present invention also includes a cutting insert with provisions for attaching to a rotor with a threaded fastener by way of an anti-rotation interface that locates the cutting insert on and relative to the rotor using a single-surface interface, unlike prior art where two surfaces (one radial and one axial) are used to locate the cutting insert relative to the rotor. The final element of the present invention is a self-tightening, anti-incursion, compact rotary seal that uses a standard/general-purpose elastic ring.

The present invention provides critical new characteristics that address the shortcomings that have severely limited the viability of previous attempts at commercializing rotating-insert cutting tools. Specifically, the present invention provides (1) precision load-bearing capacity with high manufacturability at low-to-medium production volumes in both the RSD and cutting insert, (2) an anti-loosening insert mounting that is simple and low-cost with the familiar look, feel and function of a threaded fastener (basic screw or nut), and (3) economical low-friction rotary sealing in the compact space available.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION OF THE INVENTION

Figure 4A:
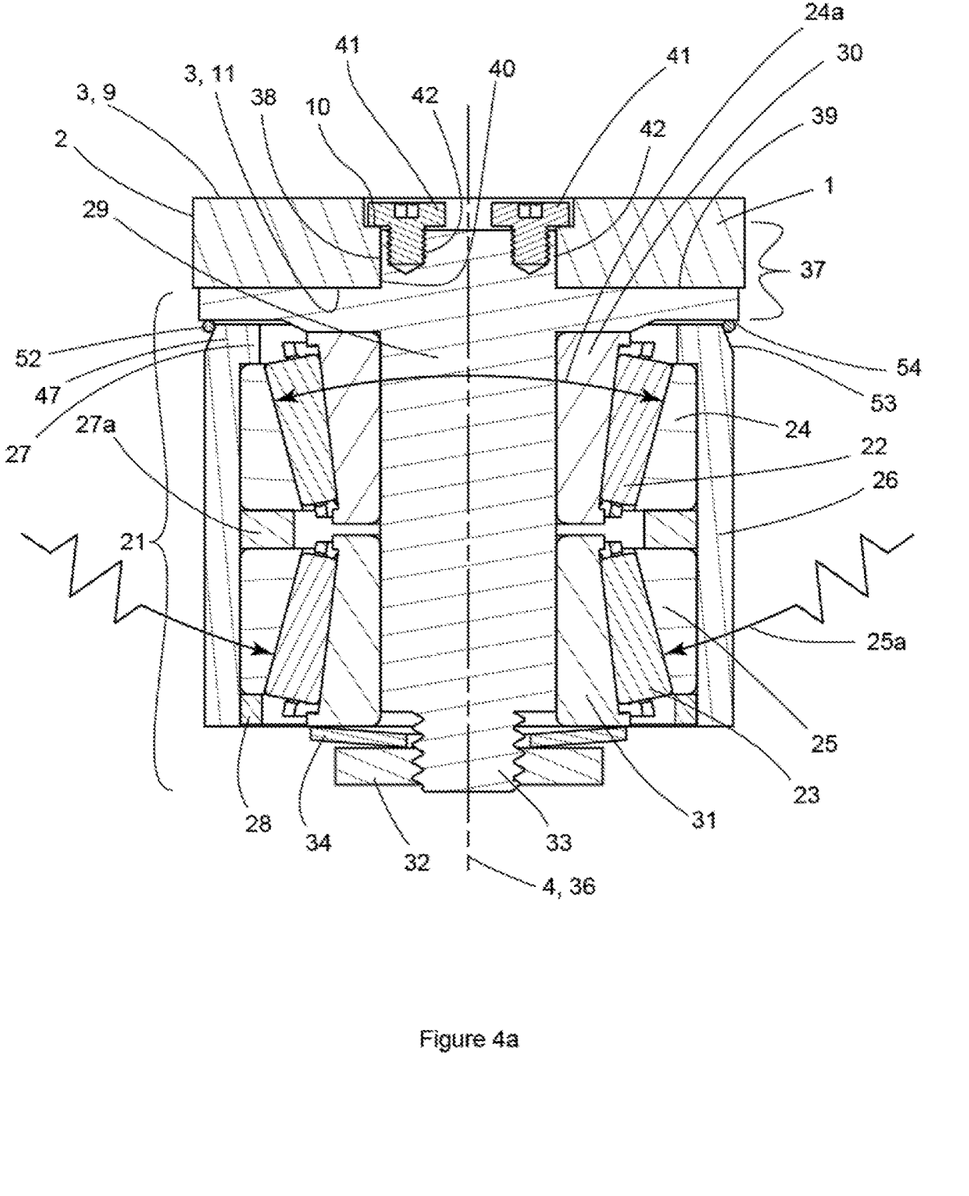
FIG. 4a is a section view of a rotary support device architecture where two stand-alone tapered roller bearings are held in a housing forming the stator to radially and axially support and preload the rotor, upon which a cutting insert is mounted and supported by two interfaces—one cylindrical and one axially planar—between the cutting insert and rotor upper end and attached with multiple insert fasteners.

The present invention is a rotary cutting insert and support device that comprise a round cutting insert 1 and a rotary support device (RSD) 21 as shown in FIG. 4a. Cutting insert 1 may be of radial mount type where flank surface 5 (as was shown in FIG. 2) is the peripheral surface 2 and rake surface 6 (as was shown in FIG. 2), the surface on which the chip of removed material is formed, is one of the end surfaces 3 (upper end surface 9). Alternatively, cutting insert 1 may be of tangential mount type where rake surface 6 (as was shown in FIG. 3) is the peripheral surface 2 and flank surface 5 (as was shown in FIG. 3) is upper end surface 9. This invention promotes and enables the novel use of cutting inserts that are unusually large in diameter relative to what is conventionally seen in round rotating inserts, typically less than 26 mm as in the Rotary Technologies Corp. Gen-II products and commercially available, down to 12 mm in the Pokolm Spinworx® product. In fact, making the insert larger in diameter is contrary to the commonplace inclination to reduce the diameter of the round insert from the mindset of saving on the valuable insert material and to reduce the amount of process force directed into the surface being produced. However, by introducing larger round rotating insert diameters from 25 mm up to, without limitation, 100 mm, the user achieves significantly more cutting edge and machining time between insert changes and, in particular for tangential mount applications, may gain significant productivity by being able to run at much larger feed rates while maintaining a desired surface finish.

In this vein, the embodiment shown in FIG. 4a is generally for a cutting insert that is large in diameter relative to commercially available standard tapered roller bearings that generally, but without limitation, have a bore diameter greater than 15 mm, an outer diameter greater than 35 mm, and axial dimension greater than 10 mm, or 25 mm for double-tapered roller bearings. In this embodiment, standard double-tapered roller bearings can generally be used more economically than a pair of single tapered roller bearings. In FIG. 4a, upper bearing 22 and lower bearing 23 oppose each other in their tapers, oriented relative to each other as shown in FIG. 4a or with their tapers both opposite that shown in FIG. 4a. Their respective outer raceways, often referred to as "cups", (upper outer raceway 24 with upper included angle 24a and lower outer raceway 25 with lower included angle 25a (note that callout is broken in order to fit in figures; note also that lower included angle 25a is defined relative to the same reference as for upper included angle 24a, resulting in lower included angle 25a being greater than 180°, as shown)) are held compressed together axially in housing 26 between axial stop 27 and axial retainer 28, with spacer 27a as needed. In the case shown in FIG. 4a, generally but without limitation, upper included angle 24a is in the range of 10° to 120° inclusive and lower included angle 25a is in the range of 240° to 350° inclusive. If the tapers are oriented opposite that shown in FIG. 4a, then, generally but without limitation, upper included angle 24a is in the range of 240° to 350° inclusive and lower included angle 25a is in the range of 10° to 120° inclusive. Housing 26 along with upper outer raceway 24 and lower outer raceway 25 together serve as the stator.

Figure 4B:
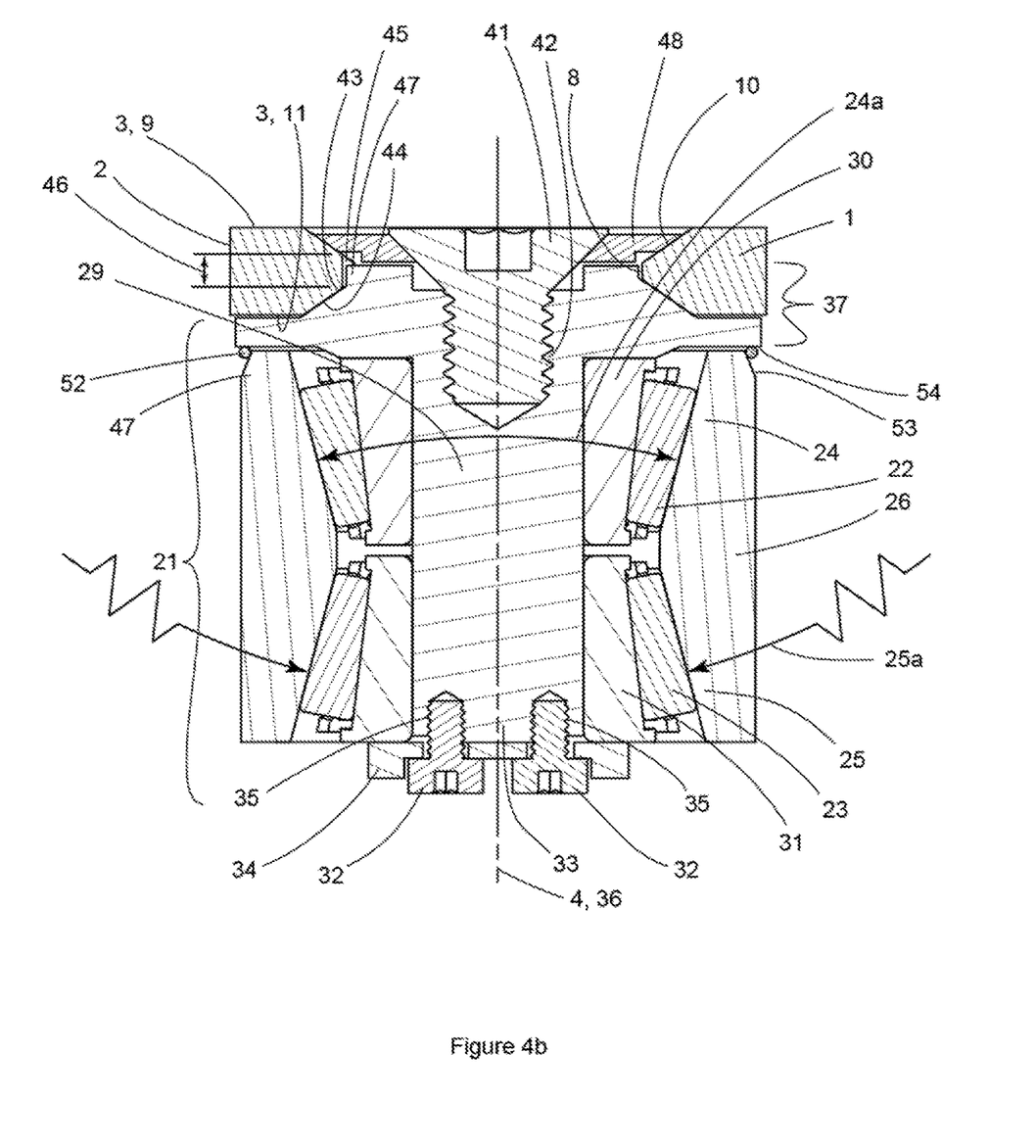
FIG. 4b is a section view of a rotary support device architecture where the outer raceways (cups) of two tapered roller bearings are integrated with one another, also serving as the housing (stator), showing also the use of preload faster(s) that are non-concentric with the rotor axis as a means of avoiding inadvertent loosening of the preload fastener(s), and a cutting insert being mounted to and supported by one convex interface on the rotor upper end and attached with a single coaxial insert fastener where the insert receives a protrusion on the rotor that prohibits gross rotation of the insert relative to the rotor about the rotor axis which could otherwise cause the single coaxial insert fastener to loosen.

An alternative is to integrate the bearing surfaces of upper outer raceway 24 and lower outer raceway 25 directly into housing 26 as shown in FIG. 4b. Either approach (FIG. 4a or FIG. 4b) is acceptable with FIG. 4b being generally more compact and lower cost, especially if a commercially available standard double-taper bearing set meets the sizing requirements, in which case the combined outer raceways (combined upper and lower cups) may at the same time also serve as housing 26. In this arrangement, generally but without limitation, upper included angle 24a and lower included angle 25a would be in the ranges noted previously. Housing 26 with integral outer raceways (and respective bearing surfaces) serves as the stator.

In either case (FIGS. 4a and 4b), plain bearings (sliding surfaces) may be used instead of rolling-element bearings. In any case, rotor 29 passes through upper inner raceway 30 and lower inner raceway 31 (often referred to as "cones"), which are compressed together axially by rotor upper end 37 and preload fastener 32 that engages with rotor lower end 33. The included angles associated with the inner raceways are such that they match the included angles of their respective outer raceways adjusted according to the taper angle of the rollers separating the respective inner and outer raceways. FIG. 4a illustrates preload fastener 32 to be a nut that engages with a rotor lower end 33 that is threaded. Shown also is preload element 34, which is optional, but when included will allow more precise control when setting the preload. Preload fastener 32 could alternatively be a screw that engages into a threaded hole in rotor lower end 33, again optionally with or without a preload element 34. Preload element 34 is shown as a washer, but may be any other suitable element in material and/or shape so as to provide an acceptable level of compliance to allow adjustment of the preload through tightening preload fastener 32, but also acceptable stiffness for function of the RSD in the machining process. Whether using a nut or screw as preload fastener 32, in this case where preload fastener 32 is concentric with rotor axis 36, some means of anti-rotation should be applied, such as but not limited to a thread locking compound or a pin that is non-coaxial with rotor axis 36, so preload fastener 32 will not inadvertently loosen under the rotary motion. FIG. 4b shows an alternate approach where one or more preload fasteners 32 are used, threaded into one or more preload holes 35 in rotor lower end 33, such that at least one preload hole 35 is non-coaxial with rotor axis 36.

At rotor upper end 37 is the cutting insert interface which mates with rotor interface on cutting insert 1. In FIG. 4a the cutting insert interface includes rotor pilot 38 that has at least a portion of its surface cylindrical about and coaxial with rotor axis 36, and planar mounting surface 39. The rotor interface of cutting insert 1 includes cylindrical surface 40, located in central hole 8, of which at least a portion is cylindrical about and coaxial with insert axis 4, and a planar portion of lower end surface 11. Rotor pilot 38 and planar mounting surface 39 mate, respectively, with cylindrical surface 40 and planar portion of lower end surface 11, such that insert axis 4 is coaxial with rotor axis 36. Cutting insert 1, as noted in general, has a peripheral surface 2, and one end surface 3—the upper end surface 9—that is opposite a second end surface 3—the lower end surface 11. Central hole 8 passes through cutting insert 1 from upper end surface 9 to lower end surface 11, said hole including cylindrical surface 40. Intermediate upper end surface 9 and central hole 8 is one or more fastener interface surfaces 10. In the embodiment shown in FIG. 4a one or more fastener interface surfaces 10 are counter-bored, though alternatively they may be countersunk. For the large diameter cutting insert of this embodiment, one or more threaded insert fastener elements 41, one corresponding to each of the one or more fastener interface surfaces 10, axially clamp cutting insert 1 to rotor 29. The threaded insert fastener elements 41 interface with one or more threaded insert fastener receivers 42 at least one of which is non-concentric with rotor axis 36. The fastener interface surface 10 may alternatively be comprised of a single counter-bore or countersink about rotor axis 36. Cutting insert 1 may be symmetric about its (horizontal) mid-plane. This allows cutting insert 1 to be flipped in order to make use of the other side for cutting after the first side is worn out.

FIG. 4b illustrates an alternative cutting insert interface that includes rotor convex surface 43, being convex relative to rotor upper end 37. Also shown is an alternate rotor interface on cutting insert 1 that includes insert concave surface 44, which is concave relative to and located within and adjacent to lower end surface 11 of cutting insert 1. Central hole 8 of cutting insert 1 has one or more receivers 45 running partially or fully through insert center thickness 46. Receivers 45 mate via loose slip fit to one or more protrusions 47 on rotor upper end 37. The mating of receivers 45 with protrusions 47 is circumferential in nature, constraining cutting insert 1 from rotation, relative to rotor 29, about rotor axis 36, but not locating cutting insert 1 relative to rotor 29 in either the rotor axial or rotor radial directions; said axial and radial locating of cutting insert 1 relative to rotor 29 is accomplished with the mating of rotor convex surface 43 with insert concave surface 44. The rotationally constraining (anti-rotation) nature of the receiver-protrusion mating allows a single threaded insert fastener element 41 to be used, one of its surfaces mating with a single fastener interface surface 10, on cutting insert 1, that is concentric with rotor axis 36, and its threaded portion engaging with a single threaded insert fastener receiver 42 that is concentric with rotor axis 36. Depending on the diametric size of central hole 8, it may be preferable or necessary to use a screw, as the threaded insert fastener 41, having a head that is smaller than central hole 8, in which case a fastener spacer 48 fills the space between the head of threaded insert fastener element 41 and fastener interface surface 10, as shown in FIG. 4b. Furthermore, some embodiments could employ a threaded rotor upper end 37 with which a nut rather than a screw is used as the threaded insert fastener element 41 that may mate directly with fastener interface surface 10 or by way of an intermediate fastener spacer 48 depending on the relative sizes of the associated components. By making upper end surface 9 and lower end surface 11 identical, that is, by making insert concave surface 44 identical to single fastener interface surface 10, both concentric with insert axis 4, cutting insert 1 may be flipped over so it can be used both ways, doubling the number of round cutting edges useable for cutting, only one at a time however.

Figure 5A:
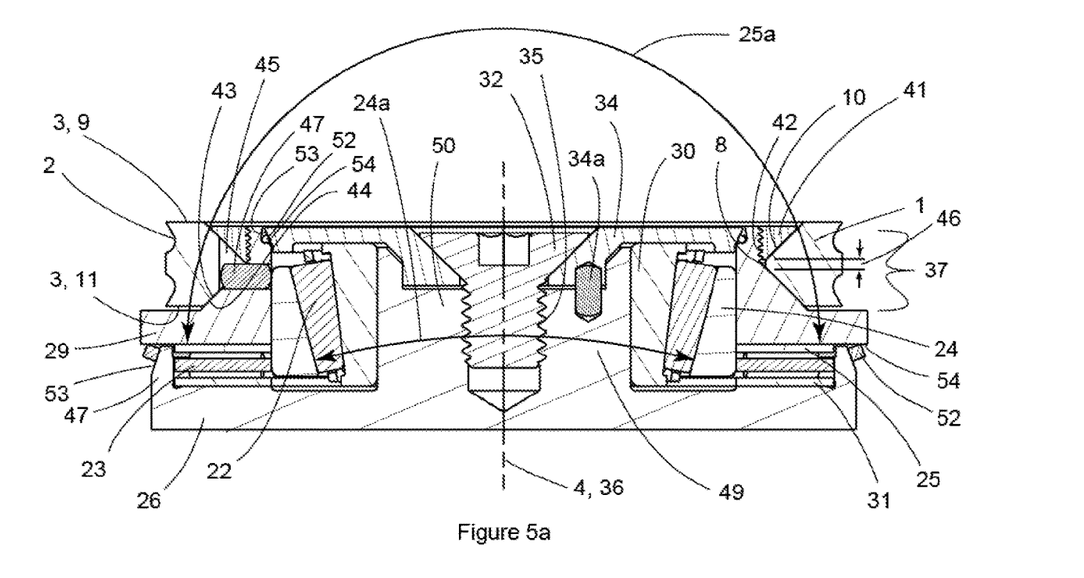
FIG. 5a is a section view of a rotary support device architecture where the rotor is supported axially at its lower end by an axial thrust roller bearing and supported radially and supported and preloaded axially (and thus radially) at its upper end by one stand-alone tapered roller bearing, where a cutting insert is mounted to and supported by one convex interface on the rotor upper end and attached with a single coaxial insert fastener where the insert receives a protrusion on the rotor that prohibits gross rotation of the insert relative to the rotor about the rotor axis which could otherwise cause the single coaxial insert fastener to loosen.
Figure 5B:
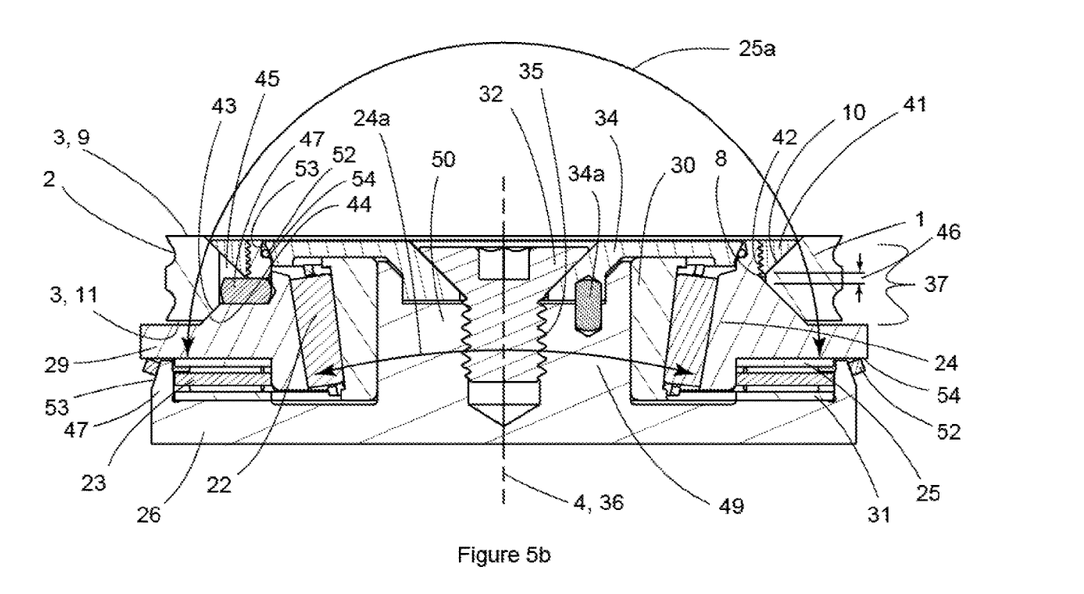
FIG. 5b is a section view of a rotary support device architecture where the rotor is supported axially at its lower end by an axial thrust roller bearing and supported radially and supported and preloaded axially (and thus radially) at its upper end by one tapered roller bearing having its outer raceway (cup) integrated with the rotor, where a cutting insert is mounted to and supported by one convex interface on the rotor upper end and attached with a single coaxial insert fastener where the insert receives a protrusion on the rotor about rotor axis which could otherwise cause the single coaxial insert fastener to loosen.

As shown in FIGS. 5a and 5b, when cutting insert 1 is of diameter large enough to accommodate a bearing internal to central hole 8, an alternate bearing arrangement may be used to provide the desired axial and radial support and the preload as is inherent to this invention (to eliminate radial bearing clearance/gap/slop that is inherent to radial needle bearings like those in U.S. Pat. No. 4,477,211 and U.S. application Ser. No. 12/350,181). In the cases of FIGS. 5a and 5b, upper bearing 22 is tapered as in the previous embodiments generally but without limitation exhibiting upper included angle 24a in the range of 10° to 120° inclusive. Note that the rotating/stationary raceways are the outer/inner raceways in this embodiment, which is opposite the embodiments shown in FIGS. 4a and 4b where the rotating/stationary raceways are the inner/outer raceways. Also different from the embodiments of FIGS. 4a and 4b, by being axially located generally or at least partially within central hole 8 of cutting insert 1, upper bearing 22 is capable of supporting the radial load on its own so that lower bearing 23 need only provide axial load bearing capability. That is, lower bearing 23 may be an axial thrust roller bearing as shown in both FIG. 5a and FIG. 5b; common thrust roller bearings have included angle 25a of 180° (as defined here) and thus, in general, it may be more appropriate to refer to lower bearing 23 as having a rotating raceway, rather than an outer raceway, and a stationary raceway, rather than an inner raceway. As such, the terms stationary raceway and rotating raceway may be used here to more generally indicate two raceways of a bearing without specifically indicating which is inner and which is outer. Note that some thrust roller bearings employ tapered rollers in which case the included angle 25a of the stationary raceway could be greater than 180.

When cutting insert 1 has a large enough central hole 8 to accommodate the cup of a commercially available standard tapered roller bearing, such a bearing can be used, meaning upper outer raceway 24 is separate from rotor 29 as shown in FIG. 5a. When cutting insert 1 has a central hole 8 that is too small to accommodate the cup of a commercially available standard tapered roller bearing, its central hole may still be large enough to accommodate upper bearing 22 internal to central hole 8 if the upper outer raceway 24 (its bearing surface that is) is integral to rotor 29, as shown in FIG. 5b. Unlike the embodiments of FIGS. 4a and 4b, the stationary portion of the rotary support device, the "stator" (previously associated with housing 26) is partially internal to the bearings rather than exclusively external to the bearings. As such, preload element 34 is now at the top of the rotary support device and attaches to stator 49 rather than rotor 29 as was the case in the embodiments shown in FIGS. 4a and 4b. In FIGS. 5a and 5b, preload element 34 is attached to stator 49 by engaging preload fastener 32, a single screw, with a threaded hole in stator upper end 50. Inadvertent loosening of preload screw 32 can be achieved with a thread locker as noted earlier, or as shown here with a pin 34a or a similar anti-rotation element.

In both FIGS. 5a and 5b, the similar insert mounting and support are used as in FIG. 4b with the exception that threaded insert fastener element 41 is a nut with its threaded portion engaging with a single threaded insert fastener receiver 42 that is a male thread concentric with rotor axis 36, rather than a screw engaging a female threaded hole. In these embodiments there is no need for a fastener spacer 48 to fill the space between the threaded insert fastener element 41 and fastener interface surface 10 on cutting insert 1. Again, inadvertent loosening of threaded insert fastener element 41 is avoided by one or more receivers 45 on cutting insert 1 mating via loose slip fit to one or more protrusions 47 on rotor upper end 37.

Figure 6A:
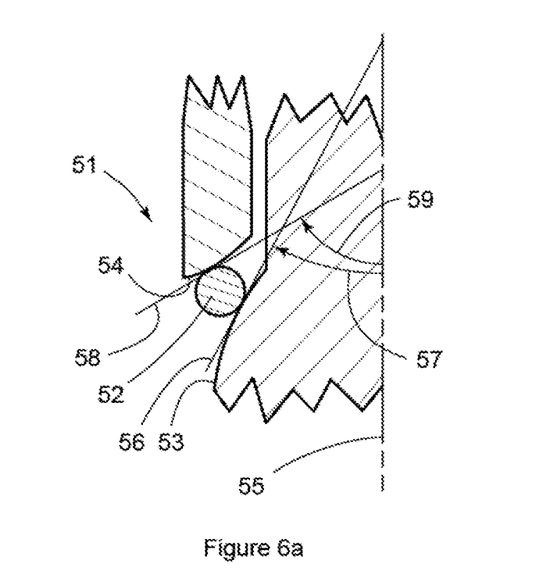
FIG. 6a is a self-tightening, compact rotary seal.
Figure 6B:
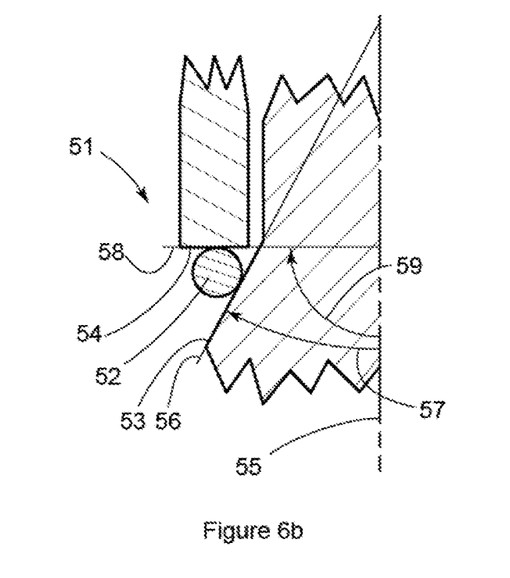
FIG. 6b is a self-tightening, compact rotary seal.
Figure 6C:
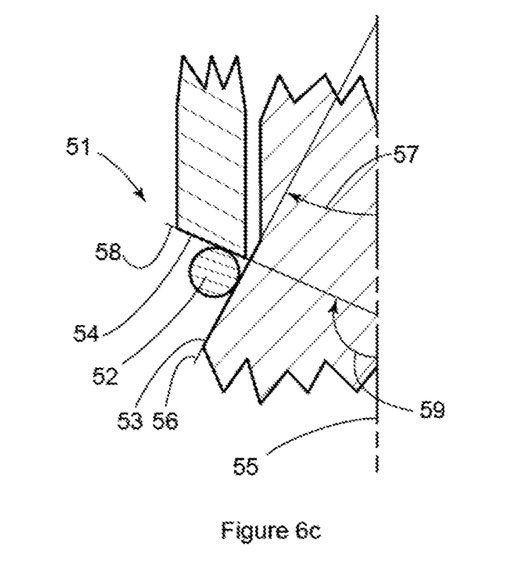
FIG. 6c is a self-tightening, compact rotary seal.

A final element of the embodiments shown in FIGS. 4a, 4b, 5a and 5b is a self-tightening, anti-incursion, compact rotary seal 51 (see FIGS. 6a, 6b, and 6c for close-up views). It is termed "anti-incursion" since a main purpose is to keep contaminants from getting into the inside of the RSD and since pressure from the outside of the RSD causes the sealing contact pressure to increase, not loosen. Rotary seal 51 comprises an elastic ring 52 that is stretched around primary seal surface 53 and interfaces with secondary seal surface 54. All four figures (FIGS. 4a, 4b, 5a and 5b) indicate where this seal and respective surfaces are located in the respective embodiments. The cross-section shape of elastic ring 52 may be round, square or lobed as seen in standard "O-rings", but may be any shape, such as but not limited to rectangular or triangular. In the noted embodiments (FIGS. 4a, 4b, 5a and 5b) primary seal surface 53 is located at the housing upper end 47 on the outer diametric surface of housing 26 and secondary seal surface 54 is located on rotor 29. In FIGS. 5a and 5b there is a second use of this seal where primary seal surface 53 is on preload element 34 and secondary seal surface 54 is on rotor upper end 37.

FIG. 6a shows the general nature of the self-tightening, anti-incursion, compact rotary seal 51 by itself. Primary seal surface 53 is axisymmetric about axis of rotation 55, equivalently in these applications referred to as rotor axis 36. Primary seal surface 53 may be conical, but more generally (as shown in FIG. 6a) is described such that primary tangent plane 56, being a plane placed at a point on and tangent to primary seal surface 53, is oriented relative to axis of rotation 55 with primary angle 57 (referred to as $\theta_p$) greater than arctan $\mu_p$, $\mu_p$ being the coefficient of friction between elastic ring 52 and primary seal surface 53, and less than 89°.

The seal functions by stretching elastic ring 52 around primary seal surface 53. Because elastic ring 52 is elastic, that is, it can stretch from its original relaxed diameter to a larger stretched diameter, and return/shrink to a relaxed diameter that is near to or equal to its original relaxed diameter, its elastic tendency to shrink its diameter will cause it to slide on primary seal surface 53 toward secondary seal surface 54 until it makes contact with, and hence seals against, secondary seal surface 54. Secondary seal surface 54 may be conical, but more generally (as shown in FIG. 6a) is described such that secondary tangent plane 58, being a plane placed at a point on and tangent to secondary seal surface 54, is oriented relative to axis of rotation 55 with secondary angle 59 (referred to as $\theta_s$) greater than primary angle 57 ($\theta_p$) and less than $\theta_p$+90°. Increasing $\theta_p$ and/or ($\theta_s$−$\theta_p$) increases the sealing force acting between elastic ring 52 and secondary seal surface 54, where the sliding motion occurs (i.e., elastic ring 52 slides rotationally on secondary seal surface 54 and is rotationally stationary relative to primary seal surface 53). Since elastic ring 52 is stretched, wear of and dimensional tolerances in the cross-section and diameter of elastic ring 52 are offset by the self-tightening action of the seal system. FIGS. 6b and 6c illustrate other orientations of secondary seal surface 54 relative to primary seal surface 53, where, for the sake of simplicity, these surfaces are shown as conical such that the tangent plane is the same at all points on the respective surface.

Figure 7A:
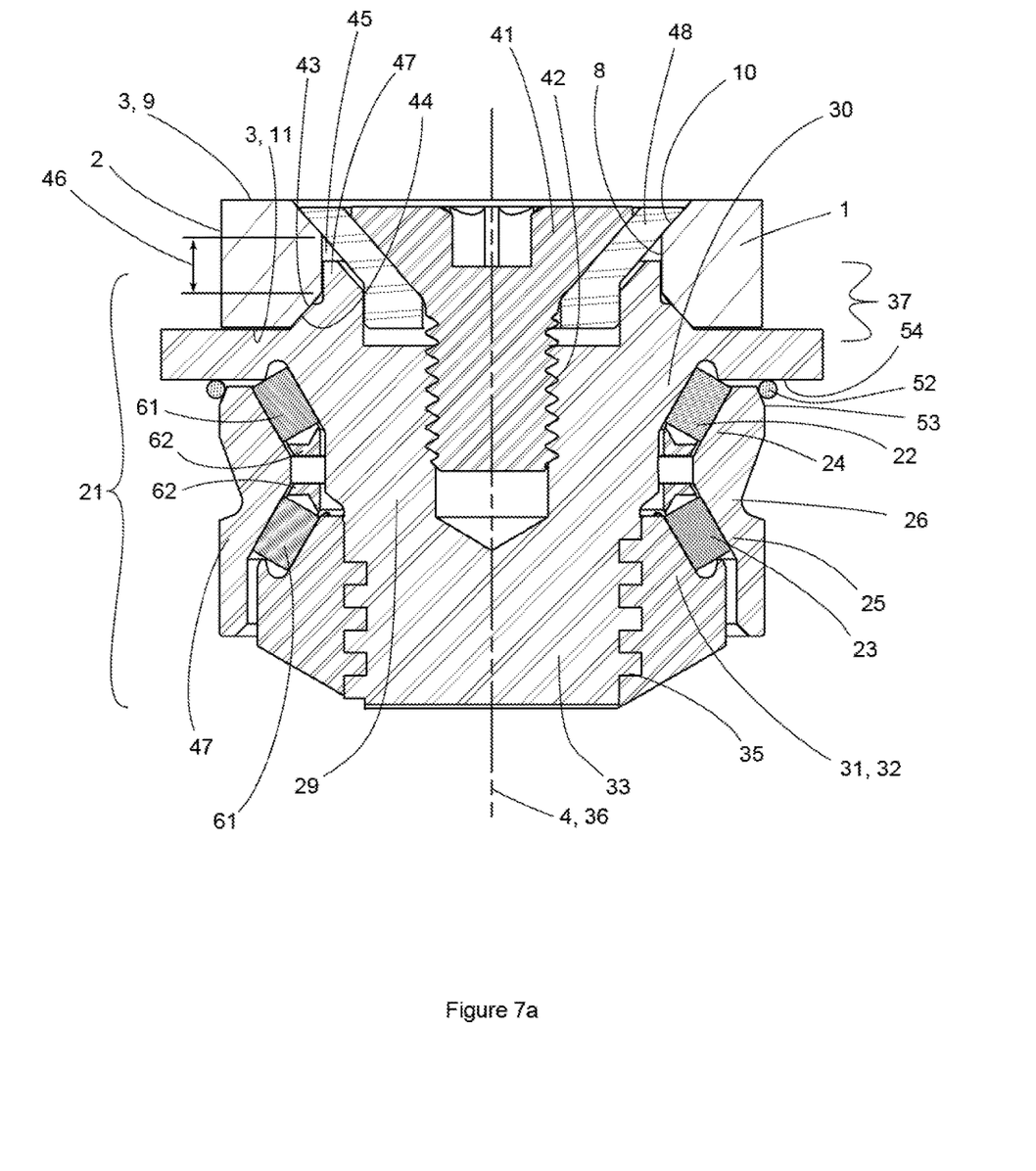
FIG. 7a is a rotary support device and cutting insert where the outer raceways (cups) of two tapered roller bearings are integrated with one another, also serving as the housing (stator), and the tapered roller bearings employ cylindrical rollers rather than frusto-conical (tapered) rollers.
Figure 7B:
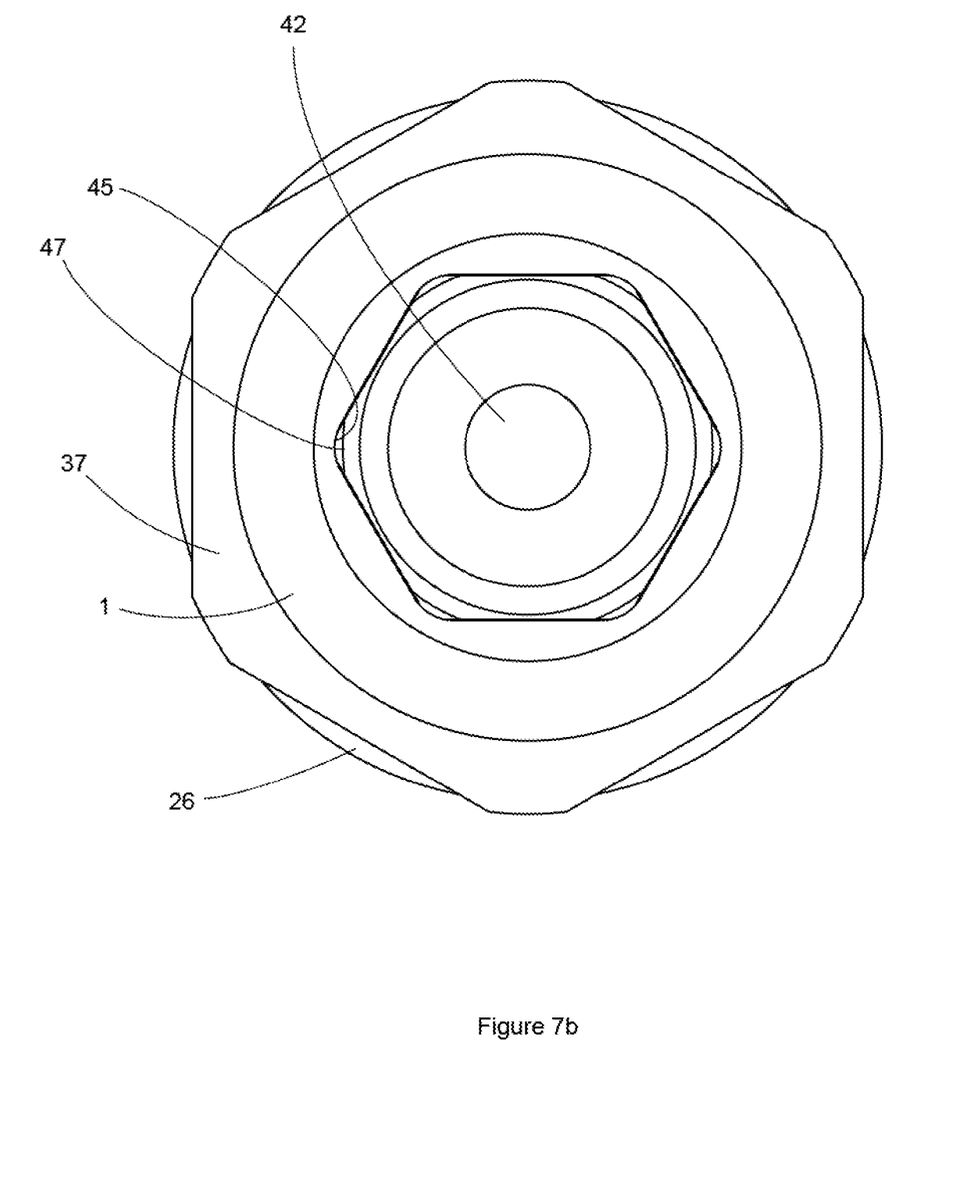
FIG. 7b is a top view of the rotary support device and cutting insert in FIG. 7a with the fastener spacer and threaded insert fastener removed to reveal another approach to incorporating anti-rotation receivers on the cutting insert and protrusions on the rotor upper end.

Many applications require a cutting insert that is smaller in diameter than can be accommodated with the relatively large size of readily available tapered roller bearings in the above embodiments. In these cases, an embodiment similar to those in FIGS. 4a and 4b can be used where generally all of the same components are employed but with simplified tapered roller bearings that are easily manufactured with readily available cylindrical roller elements (versus frusto-conical/tapered roller elements that are needed for typical tapered roller bearings). FIG. 7a shows such an embodiment. There still exists an upper outer raceway 24 and lower outer raceway 25; since an objective of this embodiment is to be very compact, like the embodiment shown in FIG. 4b, the outer raceways (cups) and their associated bearing surfaces would generally but not necessarily be integral with housing 26. The main difference is that the bearing rollers 61 are cylindrical and held in cages 62 that generally would differ from commercially available tapered roller cages. Using cylindrical rollers results in some degree of sliding/skidding along with rolling on the cylindrical surfaces of the rollers, whereas actual tapered roller bearings exhibit (theoretically) pure rolling on the tapered surfaces of the rollers if manufactured correctly/precisely. In the case of cylindrical rollers, though not necessarily, rotor 29 can provide the upper inner bearing surface, that is, serve as the upper inner raceway 30 to save space. A lower inner raceway 31 is attached to rotor lower end 33 in the same way(s) and with the same components as described earlier. FIG. 7a also shows a case where preload fastener 32 is a nut that is integrated with lower inner raceway 31 and no preload element 34 is used. FIG. 7b further shows another way of producing protrusions 47 (six of them) on rotor upper end 37 that mate via loose slip fit with receivers 45 on cutting insert 1, the mating being circumferential in nature with cutting insert 1 located and supported radially and axially by rotor upper end 37 by way of insert concave surface 44 mating with rotor convex surface 43 (see FIG. 7a).

Figure 8:
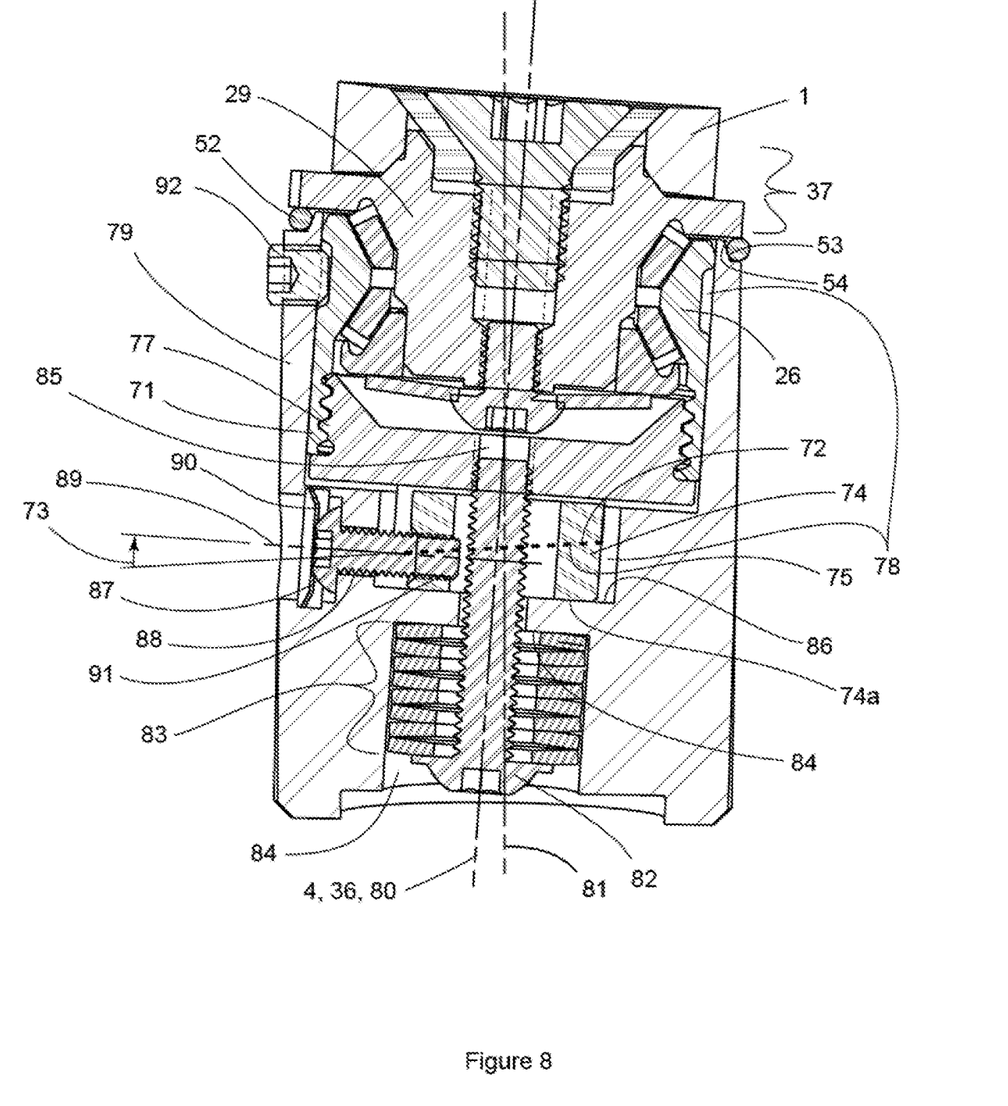
FIG. 8 is a field-adjustable rotary support device allowing the cutting insert to be adjusted to the desired position along the adjustment-axis direction.

The final embodiment of the rotary support device allows an end-user to adjust each cutting insert 1 in the field, after fully manufacturing the cutting tool on which one or more rotary support devices are attached. An example of this embodiment is shown in FIG. 8 as an extension of the embodiment of FIG. 7a. The main difference from the previous embodiments (FIG. 7a) is that housing 26 (stator) is extended axially in the direction opposite rotor upper end 37. Integrated into the housing lower end 71 (stator lower end) is wedge interface surface 72 that is at a wedge angle 73 (wedge interface surface 72 is not visible in cross-section but is indicated with a heavy dashed line) relative to being normal to rotor axis 36. Wedge angle 73 is generally, without limitation, in the range of 1 to 20 degrees. A larger wedge angle 73 will provide a larger range of adjustment, but also generally reduces the resolution of adjustment actuation. Below and mating with wedge interface surface 72 is adjustment wedge 74 having stator interface surface 75 at substantially the same (opposing) wedge angle 73 so that it mates with wedge interface surface 72. As indicated in FIG. 8 this embodiment is best achieved by attaching a separate upper wedge extension 77 to create the equivalent housing lower end 71 of this embodiment.

The aforementioned set of components, housing 26 (i.e., the stator, having rotor 29, bearings and all other components, less a cutting insert 1, assembled to and into it), upper wedge extension 77 and adjustment wedge 74, are then placed into adjustment cavity 78 in outer housing 79. Outer housing 79 is cylindrical on its outer surface for being inserted/assembled into a cylindrical pocket on a cutter body. Adjustment cavity 78 is generally also cylindrical, matching the generally cylindrical outer surface of housing 26 at their interface, the axis of which (adjustment cavity axis 80) may be parallel to outer housing axis 81, or at an angle relative to outer housing axis 81 as shown in FIG. 8. To maintain force on the mating surface of the adjustment mechanism, that is wedge interface surface 72 and stator interface surface 75, a wedge preload screw 82 passes through preload spring 83 then through, from outside of (below), spring cavity bottom 84, then through adjustment wedge 74, and ultimately threaded into preload screw hole 85 in support housing lower end 71 or upper wedge extension 77 as employed in connection to housing lower end 71.

Translation of adjustment wedge 74, specifically its cavity interface surface 74a, along adjustment cavity bottom 86 is caused by turning adjustment screw 87 that passes through adjustment hole 88 in the side of outer housing 79. This adjustment requires that adjustment screw 87 cannot move along its adjustment screw axis 89. This is achieved with screw head retainer 90. Screw head retainer 90 also serves to seal with the mating surface on the outside of outer housing 79 to keep particles of debris, and most of the liquid that may spray on the tool, from entering into adjustment cavity 78 that would otherwise contaminate the components contained therein. Translation of adjustment wedge 74, upon turning adjustment screw 87, occurs by way of the threaded interface between adjustment screw 87 and adjustment screw hole 91 in adjustment wedge 74. Shown in FIG. 8 is a locking screw 92 that serves to take up any clearance between the outer surface of housing 26 and the inner surface of adjustment cavity 78. The top of the adjustable RSD is sealed with the earlier described anti-incursion compact rotary seal where elastic ring 52, primary seal surface 53, and secondary seal surface 54 are shown in FIG. 8.

In all cases where the included angle of the mating convex and concave surfaces must be large, say greater than 90 degrees, it can be helpful to include a diametral piloting of threaded insert fastener element 41, or fastener spacer 48, in a loose slip fit to rotor 29 to assist in initially centering/seating cutting insert 1 on rotor upper end 37.

Figure 9:
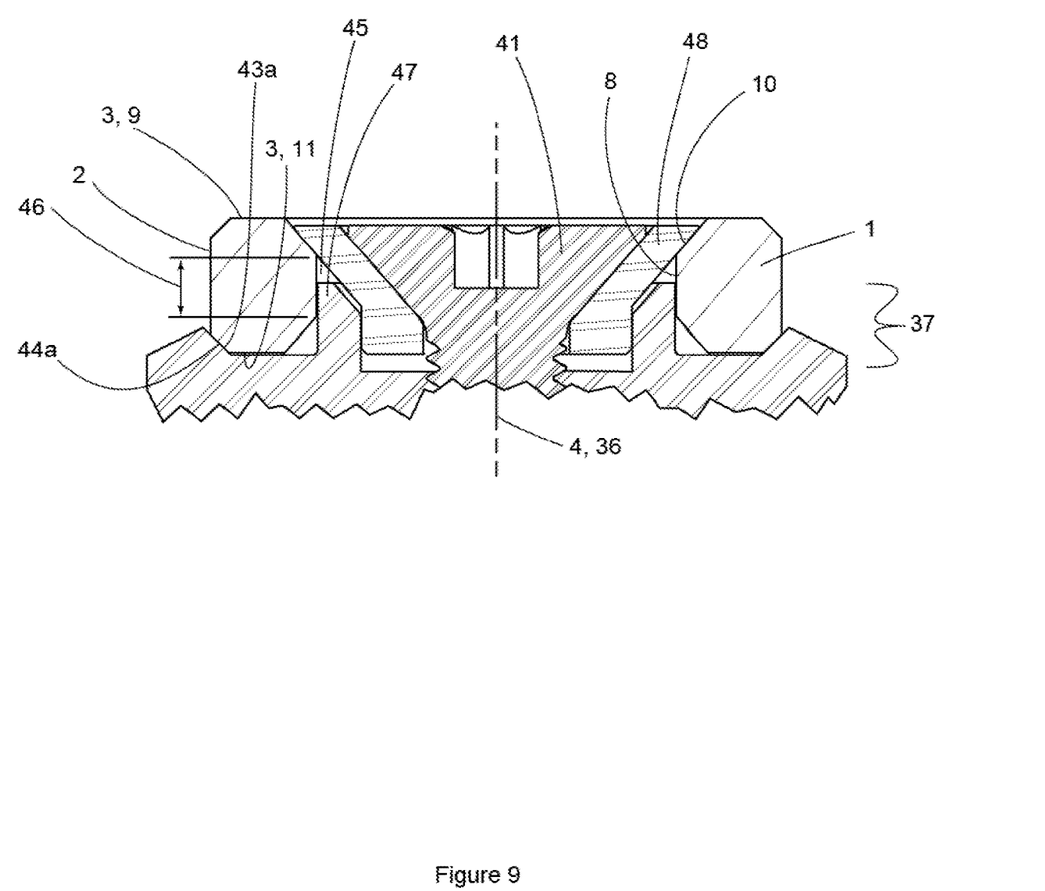
FIG. 9 is a cutting insert and rotor upper end where the cutting insert has a convex surface to mate with a concave surface on rotor upper end.

Some embodiments may benefit from cutting insert 1 having insert convex surface 44a (rather than concave as in previous embodiments), which is convex relative to and located adjacent to lower end surface 11 of cutting insert 1, between peripheral surface 2 and lower end surface 11. In this case, cutting insert interface on rotor 29 includes rotor concave surface 43a that is concave relative to rotor upper end 37. This is illustrated in FIG. 9.

Note that the approach to mounting a round cutting insert to a rotor by employing a single cutting insert interface with the rotor, where a rotor convex/concave surface mates with an insert concave/convex surface, may be applied, either with or without one or more anti-rotation protrusions 47 and receivers 45, to rotors that are supported relative to the stator by different bearing arrangements than are the subject of this invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for mechanically removing material, the device comprising:
   a. a rotary support device comprising:
      i. a rotor that is rotatable about an axis, the rotor having at least one protrusion and a cutting insert interface, the cutting insert interface having an insert mounting surface, at least a portion of which is symmetric about the axis;
      ii. a stator that is not rotatable about the axis;
      iii. an upper bearing having a rotating bearing surface and a stationary bearing surface, each bearing surface symmetric about the axis, wherein the included angle of one of the upper bearing surfaces is between 10° and 120° inclusive;
      iv. a lower bearing having a rotating bearing surface and a stationary bearing surface, each bearing surface symmetric about the axis, wherein the included angle of one of the lower bearing surfaces is between 180° and 350° inclusive, whereby the rotor is located and oriented relative to the stator by the upper bearing and the lower bearing; and
   b. a round cutting insert affixed to the cutting insert interface, the cutting insert comprising:
      i. an insert axis;
      ii. an upper end having a surface that is axisymmetric about the insert axis;
      iii. a lower end having a rotor interface, the rotor interface having a rotor mounting surface, at least a portion of which is symmetric about the insert axis to oppositely match a portion of the axisymmetric portion of the insert mounting surface;
      iv. a peripheral surface symmetric about the insert axis;
      v. a circular cutting edge at the intersection of the upper end surface and the peripheral surface;
      vi. a central hole passing from the upper end surface through to the rotor mounting surface; and
      vii. at least one receiver mating in loose slip fit with at least one protrusion.

2. The device of claim 1, further comprising a plurality of rollers between at least one stationary bearing surface and the respective rotating bearing surface, each roller mating in rolling line contact with the respective stationary and rotating bearing surfaces.

3. The device of claim 2, in which the rollers are cylindrical.

4. The device of claim 2, in which the rollers are frusto-conical.

5. The device of claim 1, in which the lower bearing is a thrust roller bearing.

6. The device of claim 1, further comprising an elastic ring, in which the stator has a primary seal surface around which the elastic ring is stretched, whereby, through contraction, the elastic ring is predisposed to sliding toward, mating with, and forming a seal against a secondary seal surface on the rotor.

7. The device of claim 1, in which the insert mounting surface has a portion that is cylindrical and a portion that is planar and the rotor mounting surface has a portion that is cylindrical and a portion that is planar, whereby the planar surfaces tightly mate with each other and the cylindrical surfaces mate with each other in a tight slip fit.

8. The device of claim 1, in which at least a portion of the insert mounting surface that is axisymmetric about the axis is concave.

9. The device of claim 1, further comprising at least one insert fastener element engaging the rotor, whereby the cutting insert is affixed to the rotor.

10. The device of claim 9, further comprising a fastener spacer, wherein at least one insert fastener element is a screw interfacing with the fastener spacer intermediate the head of the screw and the upper end of the cutting insert.

11. The device of claim 1, in which at least a portion of the insert mounting surface that is axisymmetric about the axis is convex.

12. The device of claim 1, further comprising
 a. an outer housing having an interior adjustment cavity, the interior adjustment cavity having an adjustment cavity bottom at least a portion of which is planar and normal to the axis; and
 b. an adjustment wedge having a stator interface surface inclined at a wedge angle relative to a cavity interface surface, wherein the stator has a wedge interface surface opposite the stator end adjacent to the insert mounting surface and inclined at the wedge angle, whereby the wedge interface surface mates with the stator interface surface and the wedge bottom surface mates with the adjustment cavity bottom.

13. The device of claim 1, in which at least one receiver runs at least partially through the cutting insert from the lower end toward the upper end.

14. The device of claim 1, in which the receivers are on the rotor and the protrusions are on the cutting insert.

15. The device of claim 1, further comprising an elastic ring, in which the rotor has a primary seal surface around which the elastic ring is stretched, whereby, through contraction, the elastic ring is predisposed to sliding toward, mating with, and forming a seal against a secondary seal surface on the stator.

16. The device of claim 15, in which the chips are formed on the upper end surface of the cutting insert.

17. The device of claim 15, in which the chips are formed on the peripheral surface of the cutting insert.

18. A method for mechanically removing material to create a new surface on a workpiece by removing chips of material using a device comprising:
 a. a rotary support device comprising:
  i. a rotor that is rotatable about an axis, the rotor having at least one protrusion and a cutting insert interface, the cutting insert interface having an insert mounting surface, at least a portion of which is symmetric about the axis;
  ii. a stator that is not rotatable about the axis;
  iii. an upper bearing having a rotating bearing surface and a stationary bearing surface, each bearing surface symmetric about the axis, wherein the included angle of one of the upper bearing surfaces is between 10° and 120° inclusive;
  iv. a lower bearing having a rotating bearing surface and a stationary bearing surface, each bearing surface symmetric about the axis, wherein the included angle of one of the lower bearing surfaces is between 180° and 350° inclusive, whereby the rotor is located and oriented relative to the stator by the upper bearing and the lower bearing; and
 b. a round cutting insert affixed to the cutting insert interface, the cutting insert comprising:
  i. an insert axis;
  ii. an upper end having a surface that is axisymmetric about the insert axis;
  iii. a lower end having a rotor interface, the rotor interface having a rotor mounting surface, at least a portion of which is symmetric about the insert axis to oppositely match a portion of the axisymmetric portion of the insert mounting surface;
  iv. a peripheral surface symmetric about the insert axis;
  v. a circular cutting edge at the intersection of the upper end surface and the peripheral surface;
  vi. a central hole passing from the upper end surface through to the rotor mounting surface; and
  vii. at least one receiver mating in loose slip fit with at least one protrusion.

* * * * *